United States Patent
Fender et al.

(10) Patent No.: US 10,685,021 B2
(45) Date of Patent: Jun. 16, 2020

(54) COMPLETE, CORRECT AND FAST COMPILE-TIME ENCODING INFERENCE ON THE BASIS OF AN UNDERLYING TYPE SYSTEM

(71) Applicant: Oracle International Corporation, Redwood Shores, CA (US)

(72) Inventors: Pit Fender, Union City, CA (US); Sam Idicula, Santa Clara, CA (US); Nipun Agarwal, Saratoga, CA (US); Benjamin Schlegel, Merced, CA (US)

(73) Assignee: Oracle International Corporation, Redwood Shores, CA (US)

( * ) Notice: Subject to any disclaimer, the term of this patent is extended or adjusted under 35 U.S.C. 154(b) by 303 days.

(21) Appl. No.: 15/791,696

(22) Filed: Oct. 24, 2017

(65) Prior Publication Data

US 2019/0121893 A1    Apr. 25, 2019

(51) Int. Cl.
*G06F 16/00*       (2019.01)
*G06F 16/2453*   (2019.01)
*G06F 8/41*         (2018.01)

(52) U.S. Cl.
CPC ...... *G06F 16/24549* (2019.01); *G06F 8/4441* (2013.01); *G06F 16/24534* (2019.01)

(58) Field of Classification Search
CPC ......... G06F 16/24549; G06F 16/24534; G06F 16/2462; G06F 16/2453; G06F 16/2471; G06F 16/2458; G06F 8/35; G06F 8/31; G06F 8/34; G06F 8/40; G06F 11/3664; G06F 11/3668; G06F 8/4441;
(Continued)

(56) References Cited

U.S. PATENT DOCUMENTS

| | | | | |
|---|---|---|---|---|
| 5,664,172 A | * | 9/1997 | Antoshenkov .... | G06F 16/24524 707/700 |
| 2002/0054909 A1 | * | 5/2002 | Runkel ................. | A01N 37/18 424/484 |

(Continued)

OTHER PUBLICATIONS

VanBenschoten et al., "Revisiting SQL typing in CockroachDB", dated Jun. 9, 2016, Cockroach Labs, 30 pages.
(Continued)

*Primary Examiner* — Anh Ly
(74) *Attorney, Agent, or Firm* — Hickman Palermo Becker Bingham LLP

(57) ABSTRACT

Techniques are described herein for introducing transcode operators into a generated operator tree during query processing. Setting up the transcode operators with correct encoding type at runtime is performed by inferring correct encoding type information during compile time. The inference of the correct encoding type information occurs in three phases during compile time: the first phase involves collecting, consolidating, and propagating the encoding-type information of input columns up the expression tree. The second phase involves pushing the encoding-type information down the tree for nodes in the expression tree that do not yet have any encoding-type assigned. The third phase involves determining which inputs to the current relational operator need to be pre-processed by a transcode operator.

20 Claims, 7 Drawing Sheets

EXEMPLIFIED RUN OF PHASE ONE FOR THE EXPRESSION TREE OF FIG. 2

(58) Field of Classification Search
CPC .... G06F 16/00; G06F 17/30474; G06F 17/30; G06F 16/24535; G06F 16/93; G06F 16/248
See application file for complete search history.

(56) References Cited

U.S. PATENT DOCUMENTS

| | | | | |
|---|---|---|---|---|
| 2002/0059643 | A1* | 5/2002 | Kitamura | H04N 5/4401 725/136 |
| 2005/0122337 | A1* | 6/2005 | Chen | G06T 11/40 345/545 |
| 2005/0232232 | A1* | 10/2005 | Farber | H04W 88/181 370/352 |
| 2006/0218123 | A1* | 9/2006 | Chowdhuri | G06F 16/24532 |
| 2008/0120322 | A1* | 5/2008 | Liu | G06F 16/81 |
| 2009/0228514 | A1* | 9/2009 | Liu | G06F 16/8365 |
| 2009/0327255 | A1* | 12/2009 | Larson | G06F 16/8365 |
| 2011/0196857 | A1* | 8/2011 | Chen | G06F 16/24539 707/714 |
| 2012/0079464 | A1* | 3/2012 | De Smet | G06F 16/2452 717/143 |
| 2012/0323885 | A1* | 12/2012 | Wang | G06F 16/2456 707/714 |
| 2013/0049998 | A1* | 2/2013 | English | H04L 65/605 341/51 |
| 2015/0234895 | A1* | 8/2015 | Erdogan | G06F 16/24542 707/714 |
| 2017/0177303 | A1* | 6/2017 | Ma | G06F 8/30 |
| 2018/0039575 | A1* | 2/2018 | De Smet | G06F 12/0811 |

OTHER PUBLICATIONS

Lin, Weisheng, "Type Inference in SQL", dated Apr. 2004, http://spectrum.library.concordia.ca/7920/1/MQ91069.pdf, 95 pages.

* cited by examiner

EXAMPLE EXPRESSION TREE REPRESENTING A PREDICATE

| (SUB)EXPRESSION TREE 310 | COMPUTE NOTES 330 |
|---|---|
| 3<br>312 | Constant-Node → No Encoding Needed<br>332 |
| $column_X$<br>314 | Column-Node → Assigning DSB2-encoding<br>334 |
| ```
    |
   / \
  3  column_X
```<br>316 | Expression-Node →<br>call ConsolidateEncoding (undef., DSB2)<br>returns DSB2<br>$cons\_in\_enc$ ← DSB2<br>data-type between current node and children:<br>both number → assigning consolidated encoding's value<br>assigned encoding: DSB2<br>336 |
| $column_Y$<br>318 | Column-Node → Assigning DSB4-encoding<br>338 |
| ```
       ==
      /  \
     |   column_Y
    / \
   3  column_X
```<br>320 | Expression-Node →<br>call ConsolidateEncoding (DSB2, DSB4)<br>returns DSB4<br>$cons\_in\_enc$ ← DSB4<br>data-type between current node and children:<br>both number → assigning consolidated encoding's value<br>assigned encoding: DSB4<br>340 |

EXEMPLIFIED RUN OF PHASE ONE FOR THE EXPRESSION TREE OF FIG. 2

FIG. 3

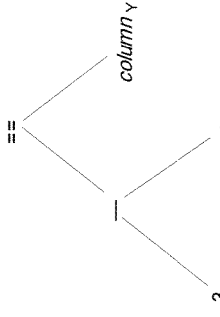
FIG. 4 EXEMPLIFIED RUN OF PHASE TWO FOR THE EXPRESSION TREE OF FIG. 2

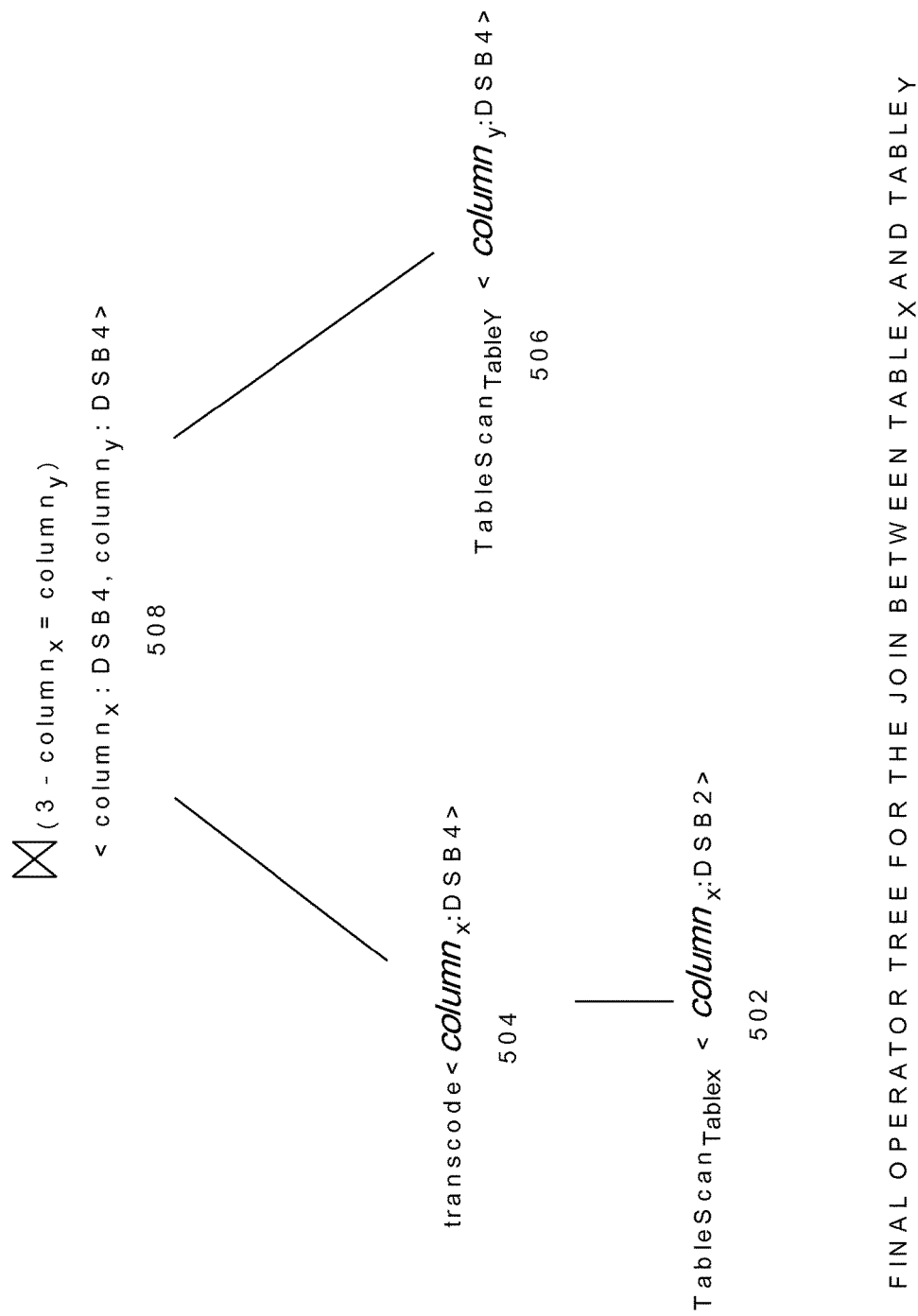
FIG. 5 FINAL OPERATOR TREE FOR THE JOIN BETWEEN TABLE$_X$ AND TABLE$_Y$ Complete, Correct and Fast Compile-Time Encoding Inference on the Basis of an Underlying Type System

FIELD OF THE INVENTION

The present invention relates to complete, correct and fast compile-time encoding-type inference based on an underlying encoding-type system.

BACKGROUND

Relational and object-relational database management systems store information in tables in a database. To retrieve data, query statements requesting data are submitted to a database server. The database server processes the queries and returns the requested data. Processing a query involves parsing the query, generating a set of query plans, selecting the optimal query plan, and sending the optimal execution plan for execution. A query plan can also be considered as an ordered grouping of expression trees. Typical examples of expression trees are a column in a projection list of an operator, or a grouping column, order by column or a predicate.

During execution of the query plan, the runtime system may need to deal with multiple possible encodings for the given data types in its expression tree.

Assuming that a database system supports different encoding types for a same data-type, some problems arise. One problem is that dealing with different encodings at runtime presents significant complications in the runtime operator code. Another problem is that, in database systems that employ vectorization, efficient vectorization becomes difficult, particularly as expressions increase in complexity. A third problem is a difficulty in avoiding decoding/re-encoding of values through the application of constants.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a diagram depicting a sample run of the Phase One algorithm for the example expression tree according to an embodiment.

FIG. 4 is a diagram depicting a sample run of the Phase Two algorithm for the example expression tree according to an embodiment.

FIG. 5 is a depiction of the final operator tree for the expression tree according to an embodiment.

DETAILED DESCRIPTION

Figure 1:
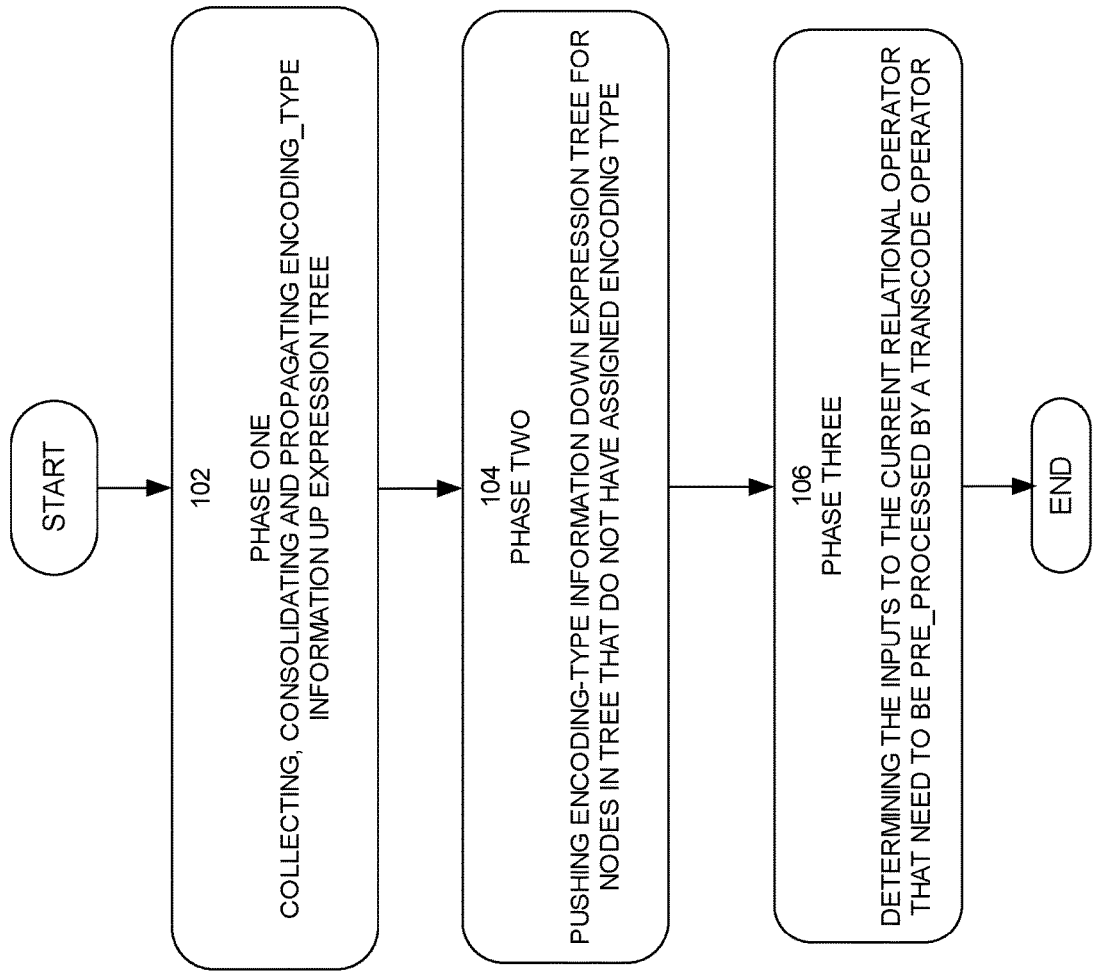
FIG. 1 is a flowchart depicting the algorithm according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview: Database Systems

A database management system (DBMS) manages a database. A DBMS may comprise one or more database servers. A database comprises data stored on a persistent memory mechanism, such as a set of hard disks. Data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting commands to the database server that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/WL is a common extension of SQL used when manipulating XML data in an object-relational database.

Thus, when a database server receives the original statement of a database command from a database application, the database server must first determine which actions should be performed to execute the database command, and then perform those actions. The act of preparing for performance of those actions is generally referred to as "compiling" the database command, while performing those actions is generally referred to as "executing" the database command. During the compilation of a query statement, the database server may perform a significant amount of preliminary work for the statement, such as parsing, semantic analysis, and query plan generation.

An SQL query submitted to a database server goes through a query compilation phase where the query goes through a query parser and a query optimizer. The query optimizer selects an optimal query plan which is then passed on to the query execution engine as a query execution plan to be executed during runtime.

General Overview: Encoding Types

During the execution of a query plan, the runtime system may deal with multiple possible encodings for a given data type in the expression tree.

A data type represents a finite domain of values while an encoding type is a specific representation of a value. For example, the data type—number—may have different encodings, i.e. representations: one encoding may be an Oracle Number, another encoding may be a DSB (Decimal Scaled Binary) Number. In another example, a string data type may have a Variable Length Character (Varchar) coding, or the string may be a sorted Dictionary-encoded string. The Oracle Number and Varchar encodings are variable-width encodings. DSB and Dictionary encodings are fixed-width encodings.

There is a benefit from having a degree of freedom in choosing between multiple encoding-types for the same data-type: In general, variable-width encoding types are more flexible since the variable-width encoding types support more operations, e.g., allowing the direct application of 'like' predicates. On the other hand, since fixed-width encoding types have a compact representation and consume less space, memory requirements are easier to estimate, and these encoding types allow for more efficient processing. In some cases, in order to exploit special hardware acceleration features, fixed-width encodings may become a requirement. In other cases, there may be some operations that cannot process fixed-width encodings. One example of such an operation is the 'like' filter, which only can be applied on Varchar/Char encodings and not on character dictionary encoding.

Database systems often assume variable-width encodings rather than fixed-width encodings. When fixed-width encodings are used, the fixed-width encodings are typically limited to 4 bytes/32 bit encoding values. However, it is beneficial to consider many more fixed-width encodings, with width, ranges from 1 byte to 8 bytes, particularly because not all encodings can be processed with the same efficiency.

Assuming that a database system supports different encoding types for the same data-type, there are three major problems:

Dealing with different encodings during runtime: When comparing many values or when applying an arithmetic computation between many values, different encodings need to be matched. This is because each data-type may be represented by different encoding types. Therefore, different encodings need to be matched. A solution to this is through runtime checks. However, such runtime checks complicate operator code, and lead to branching of the operator code. Depending on the results of the check, decoding and re-encoding of already encoded values may need to be performed.

Efficient Transformation of Encodings: Database systems may employ vectorization to achieve efficiency. However, it is difficult to achieve efficient vectorization while also performing expression processing with checks on encoding and matching encoding types. Accomplishing efficient vectorization becomes more complex as the complexity of an expression increases.

Avoiding decoding/re-encoding of values through constant folding: Constant folding is the process of identifying and evaluating constant expressions at compile time rather than computing the expressions at run time. Constant folding is employed during query rewrite by rewriting expressions or predicates for the sake of simplification and complexity reduction. Sometimes this has the positive result that a (sub)expression may be computed earlier, at compile-time. This early compile-time computation has the effect of reducing the number of constants that need to be evaluated at runtime. However in many cases, constants cannot be removed, and only occasionally does the number of constants get reduced. For such cases, there are two possibilities:

1. Database system may not have different encoding-types for the same data-type. Hence, there is no need to infer an encoding-type. This is because, if only one encoding is used, then there is no matching to be done because different encodings (of different data-types) are non-ambiguous 2. If there are different encoding-types available to encode a constant, then an arbitrary one may be chosen. Later, during runtime of the query execution plan, the encoding-type of the constant gets matched with the encoding type of another child of the expression node. The expression may be either in form of an arithmetic, string or comparison operation. The matching operation will involve decoding/re-encoding and will cause a performance penalty.

In database systems storing data with different encoding-types, these issues may be resolved by employing the approach described herein using compile-time encoding-type inference. The approach is of particular interest for column stores. Using a compile-time encoding inference system eases vectorization in operator code by transforming encoding matching from runtime into compile-time. Using the transcode operator described herein to decouple encoding inference from data-type checking eases code maintainability and improves performance.

Compile-Time Encoding-Type Inference

Current database systems employ runtime checks to detect the occurrence of different encoding types. During these runtime checks, different encoding types need to be matched, and this, in turn, implies that decoding/re-encoding operations will need to take place. However, these checks complicate the operator code and lead to branching. Branching involves generating duplicate operator code, each branch corresponding to a possible encoding type. Multiple variables, each variable with multiple possible encoding types, leads to an explosion of duplicate operator code branches.

In embodiments disclosed herein, a transcode operator is introduced to avoid branching and enable/simplify vectorization. However, use of this operator requires that the transcoding operation be setup with correct encoding information at or before runtime.

In embodiments disclosed herein, the issue of setting up transcode operators with the correct encoding information at runtime is resolved by inferring encoding types ahead—moving the inference of encoding types to compile time.

Some definitions are first described herein.

Definition: Transcode is an operator that re-encodes one or more input columns to specific encodings at the same time. Columns that do not need a re-encoding are passed through. Thus, encoding-type matching logic does not need to be part of the operator code anymore (join/filter/group by/order by). This potentially reduces branches and therefore simplifies vectorization of the operator code.

Definition: A result vector is a vector of output columns of a physical operator. A column may be either a pass through column or may be computed by an expression during the execution of the operator.

Definition: An expression tree is a tree of at least size one, where every node in the tree may consist of three main types:

Input columns: In the description herein, this node type is referred to as a column-node. Input columns may either be base columns, e.g., if the expression tree is part of a table scan, or these input columns may point to columns that are attributes of intermediate relations. Column-nodes must be either leaf nodes in an expression tree, or root nodes when there is just one node in the expression tree.

Operands: In the description herein, this node type is referred to as an expression-node. Expression-nodes may represent arithmetic operands or comparison operands. Expression-nodes may be either root nodes or inner nodes in the expression tree.

Constants: In the description herein, this node type is referred as a constant-node. Constant-nodes must be leaf nodes in an expression tree, or the constant nodes may be root nodes when there is just one node in the expression tree.

According to the definition of an expression tree, each element of a result vector is an expression tree. Each predicate is also an expression tree. Any order-by or group-by column is also an expression tree.

In embodiments disclosed herein, the computation for deducing the encoding-types for an expression tree consists of three phases. The three phases are shown in FIG. 1, and are:

Phase One: as depicted in operation 102 of FIG. 1, this phase involves collecting, consolidating, and propagating the encoding-type information of input columns up the expression tree.

Phase Two: as depicted in operation 104, this phase involves pushing the encoding-type information down the tree for nodes in the expression tree that do not yet have any encoding-type assigned.

Phase Three: as depicted in operation 106, this phase involves determining which inputs to the current relational operator need to be pre-processed by a transcode operator.

The pseudo-code below depicts the combined Encoding Inference algorithm:

---
Encoding Inference: Pseudo Code
---

```
ENCODINGINFERENCE(T)
    /* Input: expression tree T
       Output: a set R of input operators that need to be
       processed by a transcode */
    PHASEONE(T)
    PHASETWO(T)
    return PHASETHREE(T)
```
---

The output of the ENCODINGINFERENCE algorithm is a set R of relational operators that need an additional transcode operation. All elements of R will be input operators to the current operator during execution. If R is empty, no transcode operation is needed. Otherwise, a transcode operation will need to be added between each operator in R and the current operator.

Phase One: Propagating Encoding Information Bottom-Up

The goal of this phase is to propagate, through an expression tree, the encoding information of column-nodes bottom-up until the root of the expression tree is reached. The pseudo-code for Phase One is shown below:

---
Phase One: Pseudo-code
---

```
CONSOLIDATEENCODING(enc1, enc2)
    /* Input: encoding information enc1, enc2
       Output: consolidate encoding */
    1. if enc1 ≠ undefined ∧ (enc1 subsumes enc2 ∨ enc1 = enc2)
    2.     return enc1
    3. elseif enc2 ≠ undefined ∧ enc2 subsumes enc1
    4.     return enc2
    5. else return undefined
PHASEONE(T)
    /* Input: expression tree T */
    1. r ← root of the expression tree T
    2. PHASEONESUB(r)
PHASEONESUB(n)
    /* Input: node n */
    1. if n.type is column-node
    2.     cn ← (column-node)n
    3.     n.encoding ← cn.GETCOLUMN( ).encoding
    4. elseif n.type is expression-node
    5.     exp ← (expression-node)n
    6.     iter ← exp.GETCHILDITERATOR( )
    7.     while iter.HASNEXT( )
    8.         child ← iter.NEXT( )
    9.         PHASEONESUB(child)
   10.         enc1 ← n.cons_in_enc
   11.         enc2 ← child.encoding
   12.         n.cons_in_enc ← CONSOLIDATEENCODING(enc1, enc2)
   13.         if child.data_type = n.data_type
   14.             n.encoding ← n.cons_in_enc
   15.         else n.encoding ← undefined
```

Although the algorithm works bottom-up, the logic is embedded into a depth-first search. PHASEONE is the recursion head. This algorithm takes an expression tree as an argument, extracts the root, and invokes the recursive worker function PHASEONESUB. PHASEONESUB checks for two node types: column-nodes and expression-nodes.

When a node-type determined to be a column-node, the encoding information is taken either from the base-column or from the intermediate result's output column (Line 3 of PHASEONESUB).

When a node-type is determined to be an expression-node, being inner nodes of an expression tree, the nodes have children attached to them. These children need to be processed first, so that their encoding information can be made available. The processing is performed by recursive self-invocations in Line 9 of PHASEONESUB. There is no guarantee that the encoding information of the processed child is determined during the call of PHASEONESUB. One such example is when the node type corresponds to a constant node. Phase Two of the algorithm takes care of such scenarios where the information cannot be determined. But regardless of the success in determining the child's encoding information, it might not be applicable to the current node's encoding. This happens when the data-type between an expression-node and its child nodes do not match. For those instances, the encodings may not be matched either.

There is another observation to make: For almost all expression-nodes all children are of the same data-type. An exception to this rule are case/if/then expressions. Those expressions need special handling (not shown in the pseudo-code).

In order to consolidate child encodings, the algorithm maintains a field called cons_in_enc that is a member of an expression node. As noted previously, this field's encoding information might not match the expression-node's encoding information. Independent of whether a child's encoding information is inferred or not, the information is stored in line 11 of PHASEONESUB. Its value and the current value of cons_in_enc are consolidated through a call to CONSOLIDATEENCODING in line 12. CONSOLIDATEENCODING depicts determination of a minimal encoding which subsumes the two input encodings and returns the result. The term minimal is used to describe a partial order between encodings of the same data-type in which the order is given by a subsumption relation. The pseudo code for CONSOLIDATEENCODING models this only between the two input encodings.

Once all children of an expression node have been processed, the field, cons_in_enc, should hold the final value, given that at least for one child, the encoding could have been inferred. If that is not the case, cons_in_enc will be determined in Phase Two. With the knowledge of cons_in_enc, and in the case that the data-type between the children and the current expression-node does not change (Line 13), the encoding may be determined (Line 14). As observed before, if there is a data-type change, the encoding inference is deferred to Phase Two, and the encoding-type is left undefined (Line 15).

Phase Two: Pushing the Encoding Information Down

The pseudo code for the Phase Two algorithm is shown below:

| Phase Two: Pseudo-code |
|---|
| PHASETWO(T ) |
|    /*Input: expression tree T */ |
|    1. r ← root of the expression tree T |
|    2. PHASETWOSUB(r) |
| PHASETWOSUB(n) |
|    /* Input: node n */ |
|    1. if n.parent ≠ null ∧ n.encoding = undefined |
|    2.    p_exp ← (expression-node)n.parent |
|    3.    if p_exp.cons_in_enc ≠ undefined |
|    4.        n.encoding ← p_exp.cons_in_enc |
|    5.    elseif n.parent.data_type = n.data_type |
|              n.parent.type.encoding ≠ undefined |
|    6.        n.encoding ← n.parent.encoding |
|    7.        p exp.cons_in_enc ← n.encoding |
|    8.    else /*at this point no encoding information can be inferred. |
|    9.    Infer default encoding according to node data-type */ |
|    10.       p exp.cons_in_enc ← n.encoding |
|    11.       n.encoding_has_changed ← false |
|    12. elseif n.parent ≠ null ∧ |
|            ((expression node)n.parent).cons_in_enc ≠ n.encoding |
|    13.    n.encoding ← ((expression-node)n.parent).cons_in_enc |
|    14.    n.encoding_has_changed ← true |
|    15. else n.encoding_has_changed ← false |
|    16. if n.type is expression-node |
|    17.    exp ← (expression-node)n |
|    18.    if n.encoding ≠ exp.cons_in_enc ∧ |
|             n.encoding subsumes exp.cons_in_enc |
|    19.       exp.cons_in_enc ← n.encoding |
|    20.    iter ← exp.GETCHILDITERATOR( ) |
|    21.    while iter.HASNEXT( ) |
|    22.       child ← iter.NEXT( ) |
|    23.       PHASETWOSUB(child) |

PHASETWO is based upon a depth-first traversal. Its purpose is to populate the missing encoding information that was not determined during Phase One. However, Phase One is always required prior to employing the Phase Two algorithm.

The check in Line 1 confirms that the encoding is not yet determined. In this case, the algorithm determines whether the parent node's cons_in_enc is populated (Line 3). If this is so, the current encoding can be set to the parent's cons_in_enc value (Line 4). Otherwise, it is determined that there is no data-type change between the parent and the current node and that the parent's encoding information was determined already (Line 5). For these scenarios, the encoding information is copied from the parent node and the parent's cons_in_enc is assigned with the same encoding information. For all other cases, the encoding information needs to be determined from the data-type. This means that, for each data-type, the corresponding default encoding is assigned. Since the encoding was not set during the Phase One algorithm, the current node's encoding_has_changed field is set to false in Line 11. The state of the field will be pertinent later on for determining whether a transcode operator is needed. Lines 12 to 15 of the pseudo code involve considering nodes where the encoding information was populated in Phase I. In order to set the encoding_has_changed field for those nodes, their encoding information is compared with their parent's cons_in_enc information in Line 12. Depending on the result of the check, the encoding_has_changed field is set accordingly (Lines 14 or 15). The encoding information is updated only if the information has changed (Line 13).

Finally, lines 2-23 of the Phase Two pseudo-code perform the recursive descend. This involves pushing encoding updates into the cons_in_enc field when the node is an expression-node (Line 2). But this can only be done if there was no data-type change between the current node and its children. Instead of looping over the children, a subsumption test performed—this being a different and implicit way of checking if the data-type has changed. This can be done by leveraging the fact that any encoding can only be mapped to one data-type. If there is an update to be applied, then the update must subsume the current cons_in_enc encoding information which was set during Phase I. If one encoding subsumes the other, then both encodings must map to the same data-type. In other words, if the subsumption test holds, then there cannot be any data-type change, and hence the cons_in_enc encoding information needs to be updated (Line 13). During recursion through the children, this information will be picked up and propagated downwards.

Phase Three: Determining if Transcode is Needed

When allocating the plan representation of a relational operator during the code generation phase, all its corresponding expression trees need to be allocated as well. For each of those expression trees, Phases One, Two, and Three are run. If, in any of those expression trees, the encoding_has_changed field set to true in one of the leaf nodes, a transcode operator is needed. Thus, a transcode will be allocated between the relational operator producing the column that is input to the expression tree, and the relational operator itself. When there is more than one input to the relational operator, additional transcode operators might be needed if there are other leaf nodes that reference one of those other operators, and the corresponding encoding_has_changed field is set to true.

The pseudo code for PHASETHREE is shown below. The Phase Three algorithm is implemented as a depth first traversal. The output of the algorithm is a set of operators that need to be followed by a transcode operator before these operators can feed to the current operator. If the set is empty, at least one transcode (unary operator) has been avoided.

---

Phase Three: Pseudo-code

---

PHASETHREE(T )
/* Input: expression tree T
   Output: a set R of input operators that need a transcode */
   1. r ← root of the expression tree T
   2. return PHASETHREESUB(r)
PHASETHREESUB(n)
/* Input: node n
   Output: a set R of input operators that need a transcode */
   1. $R_{out}$ ← ∅
   2. if n.type is column-node ∧ n.encoding_has_changed = true
   3.     cn ← (column-node)n
   4.     op ← cn.GETPRODUCINGOPERATOR( )
   5.     $R_{out}$ ← $R_{out}$ U {op}
   6. if n.type is expression-node
   7.     exp ← (expression-node)n
   8.     iter ← exp.GETCHILDITERATOR( )
   9.     while iter.HASNEXT( )
   10.        child ← iter.NEXT( )
   11.        $R_{out}$ ← $R_{out}$ U PHASETHREESUB(child)
   12. return $R_{out}$

---

The Transcode Operator in Query Execution

As part of the compilation phase during query processing, an operator tree is generated. A query execution plan is generated on the basis of the operator tree. In embodiments described herein, completion of the Phase Three algorithm during compilation results in determination of a set of operators. A transcode operator needs to be added after each operator in this set of operators before the results of each of the operators in the set of operators are fed to the next operator in the query execution plan. Thus, transcode operators are introduced, at the end of query compilation, into the generated operator tree. The transcode operator is then executed at runtime. All the phases of the transcode operator generation can be seen in the example given below.

An Example: Performing Encoding Inference

Figure 2:
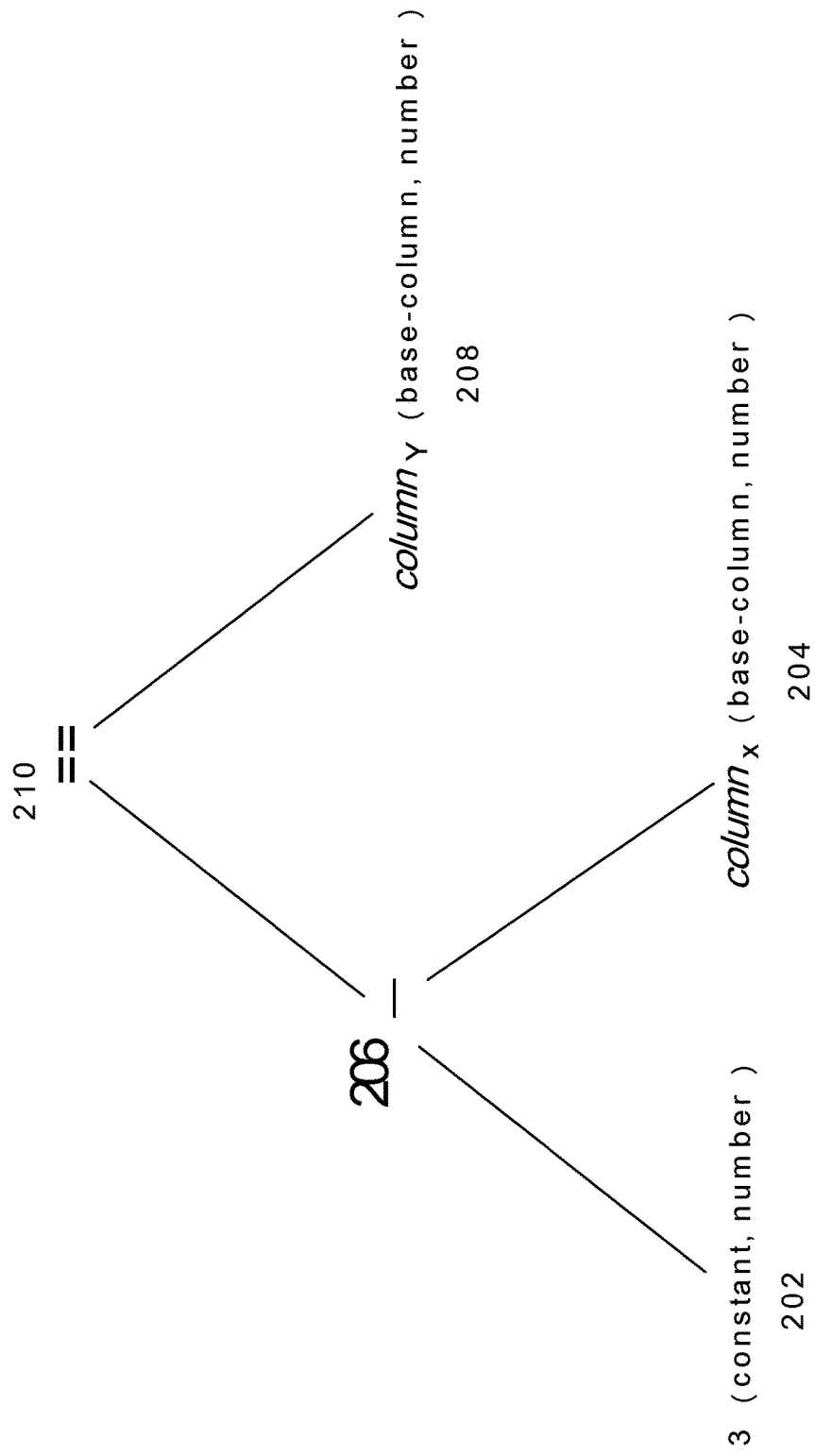
FIG. 2 is a diagram depicting an example expression tree representing a predicate according to an embodiment.

FIG. 2 depicts an expression tree rooted at node 210 depicting the join predicate (3-$column_x$=$column_y$) between two table columns, where $column_x$ belongs to $Table_x$ and $column_y$ belongs to $Table_y$. Number '3' is a constant number at leaf node 202 of the expression tree, $column_x$ is a number column at leaf node 204 of the expression tree, and the numbers are encoded with a DSB2 encoding-type. Node 206 depicts an operand '-'. $Column_y$ is a number column at node 208, where the numbers are encoded with a DSB4 encoding-type.

FIG. 3 is a tabular depiction of the execution steps of the PHASEONE algorithm. The various sub-expression trees of the expression tree representing the join predicate (3-$column_x$=$column_y$) are shown in column 310 under entries labeled 312, 314, 316, 318, and 320, respectively. As can be seen from column 330 that depicts the relevant Phase One algorithm computational features, with respect to respective table entries 332, 334, 336, 338, and 340, all nodes, except the constant node 206 of FIG. 2 representing the value 3, have been assigned with a DSB encoding-type. The constant-node '3' continues to have an undefined encoding-type.

This is corrected in the PHASETWO algorithm. The execution steps are shown as a tabular depiction in FIG. 4. Similar to FIG. 3, the sub-expression trees are depicted in column 410 as table entries 412, 414, 416, 418, and 420, respectively, and column 430 depicts the relevant Phase Two algorithm computational features with respect to table entries 432, 434, 436, 438, and 440, respectively. Here, the encoding of the expression-node labeled with a "-" (table entry 434) and the column node of $column_x$ (table entry 438) have their encodings reassigned to a DSB4 encoding. This is also marked by setting the encoding_has_changed field to true (in table entries 434 and 438). The column node of $column_x$ (table entry 440) remains assigned to a DSB4 encoding, the expression node labeled with a "==" (table entry 432) remains assigned to the DSB4 encoding, and the constant '3' gets assigned a DSB4 encoding (table entry 436).

When the PHASETHREE algorithm executes, the algorithm looks for a value of true for the encoding_has_changed fields in the column-nodes of the expression tree. In this example, the operator that feeds in $column_x$, i.e., node 206 of FIG. 2, will be added to the $R_{out}$-set.

As the PHASETHREE algorithm completes, a transcode operator is added to $column_x$ in the query expression tree. This is shown in FIG. 5 as a transcode operator 504 on $column_x$. This does not need to be a table scan on the $Table_x$, but could also, for example, be a join that has the scan of X as one of its inputs. In either case, a transcode operator needs to be allocated between the current operator and (previous) child operator 502 that projected on $column_x$. The transcode operator will re-encode $column_x$ from a DSB2 encoding to a DSB4 encoding. If $column_x$ had been encoded with a DSB4 encoding, then encoding_has_changed would have been set to false. In that case, a transcode operation would have been avoided. 506 depicts the encoding of $column_y$ as a DSB4. No further re-encoding is required for $column_y$. The final encoding for both columns x and y for the join operation are DSB4 as depicted at 508 of FIG. 5.

Advantages of Compile-Time Encoding Inference and Runtime Transcode Operator Execution Having different encoding types for a data type leads to issues such as dealing with different encodings at runtime with resulting complications in operator code, difficulty in vectorization as expression complexity increases, and avoiding decoding/re-encoding for the application of constants.

These issues are resolved with embodiments described herein. The advantages of compile-time encoding inference include:

No dealing with different encodings at runtime: Performing run-time checks to detect when different encoding types occur requires that the differently occurring encodings need to be matched. This means decoding/re-encoding operations need to take place during runtime execution. These decoding and re-encoding operators complicate the operator code and lead to branching. The transcode operator described in embodiments herein avoids branching during query execution and simultaneously enables/simplifies vectorization. However, the transcode technique leads to issues in instrumentalization of the transcode operator. Specifically, the transcode operator needs to be setup with the right encoding information. This runtime issue is resolved in embodiments described herein by inferring encoding types ahead of time—moving the runtime issue with using transcode into a compile-time issue. This is resolved in embodiments herein using compile time encoding-type inference.

Efficient Transformation of Encodings: The transcode operator described in embodiments herein is useful in any query engine that employs and benefits from vector processing. In performing a transcode step on data during query execution, the data should not be written out to main memory again but kept in the local cache for the next operator directly to consume. The concept used here is called Task Formation—succeeding operations that can be pipelined are grouped together and executed in an interleaved manner when processing the vectors. When implemented correctly there is no performance penalty for applying a transcode operator. The advantages to using a transcode operator during query execution include code simplification and enablement/simplification of vectorization.

Avoidance of decoding/re-encoding for the application of constants: An approach to avoiding decoding/re-encoding for constants involves choosing an arbitrary encoding at compile-time. However, at runtime using a query execution plan (QEP), the encoding-type of the constants will need to be matched with the encoding types of other operands—and the matching operations will involve decoding/re-encoding and thereby cause a performance penalty. In embodiments described herein, by employing compile-time encoding inference, the right encoding can be chosen at compile-time, thereby rendering any encoding matching at run-time to be superfluous.

It may be argued that the techniques described in embodiments are related to type inference. Type inference is employed by a database optimizer/compiler. While the embodiments described herein may be used for type inference for a subset of SQL, encoding-inference approach described in embodiments herein differ from data-type inference algorithms for the following reasons:

Optimal Encoding: While, with data-type inference, only one possible solution is obtained for labelling a node in the expression tree, with encoding-inference, multiple solutions are possible. One task of an encoding inference algorithm is to select the optimal encoding from different encodings. While data-types represent a finite domain of values, encoding types are a specific representation of a data-type. This leads to a one (data-type) to many (encoding-types) mapping. Challenges solved by embodiments described herein include:

Avoidance of unnecessary decoding/re-encoding operations: Decoding/re-encoding is done through execution of the Transcode operator on appropriate nodes of the query expression tree, the appropriate nodes determined during runtime. The overall goal here is to work as long as possible with the same encoding during query plan execution.

Consolidating different encodings between siblings: In embodiments described herein, consolidated encoding is employed. This involves pushing the encoding down into the sub-expression trees until the encoding reaches a leaf node—at which point, the Transcode operator is employed to produce the input that is referenced by the leaf node. If encodings were not consolidated as described herein, encoding matching during run-time will become unavoidable. While encoding type matching may be performed anywhere in the expression tree, in embodiments described herein, push-down is employed to substitute all encoding-type matching operations by a Transcode operation.

Top-Down Inference: Inferring encoding information by pushing the encoding downwards in the expression tree, as employed in embodiments herein, is fundamentally different from approaches that employ an encoding preference hint.

Side-ways Consolidation through Pull-Up and Push-Down: In embodiments described herein, encoding information is inferred by first pulling up the encoding information along the expression tree to consolidate the information prior to pushing encoding information down again. The rationale is to consolidate the encoding information with sibling nodes in the expression tree prior to pushing this information down to a leaf node.

Encoding-Inference cannot be piggybacked on Type-Inference: In the encoding-inference algorithm described in embodiments herein, encoding inference is employed on a query expression tree after all the nodes have been already labeled with the corresponding data-types. In other words, encoding-inference is decoupled from the semantic analysis/type checking phase. This leverages advantages including the following:
1. Encoding-types of base columns are usually stored in different structures of the database catalog/directory and are not persisted. This type information would need to be accessed during the semantic analysis/type checking phase if piggybacked on data-type inference.
2. Database systems may use several type-checking phases, including when complex query transformations are applied. Doing encoding-type inference each time would be a compile-time overhead that is removed by decoupling encoding-type inference from data-type inference.
3. Data-type inference code is complex. Decoupling encoding-type inference results in more manageable code.
4. For a database offload engine, encoding-type inference need be applied during code generation phase for just a subset of the query plan. Furthermore, an offload engine might even have different encoding-types, which makes decoupling a must.
5. Since encoding-type inference needs to be decoupled in embodiments described herein, exploiting already inferred type information will result in performance benefits because similar type-inference logic often need not to be re-applied. This approach of exploiting already inferred type information is superior to the alternative approach involving re-factoring and re-using existing data-type inference code.

Software Overview

Figure 6:
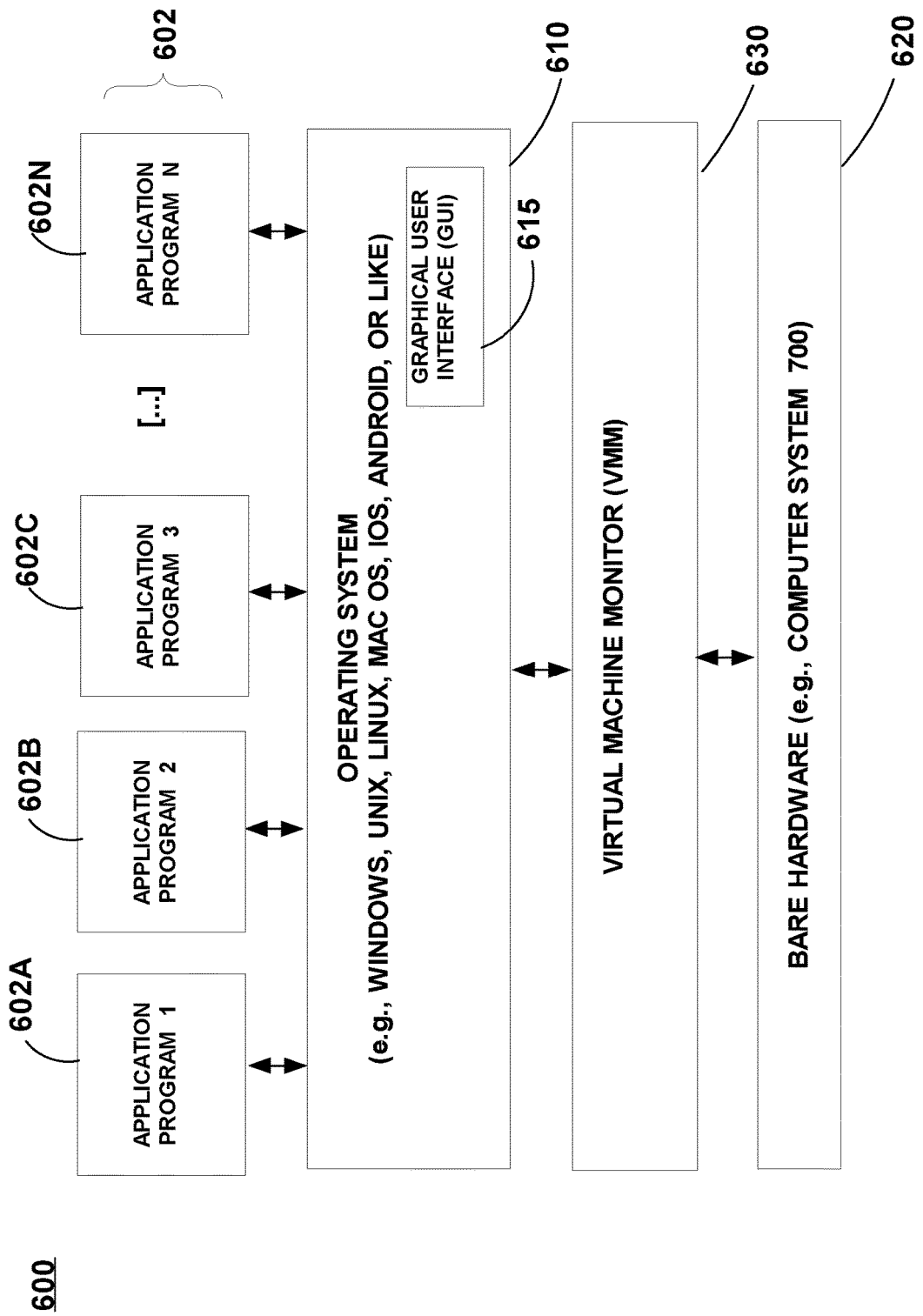
FIG. 6 is a diagram depicting a software system that may be used in an embodiment.
Figure 7:
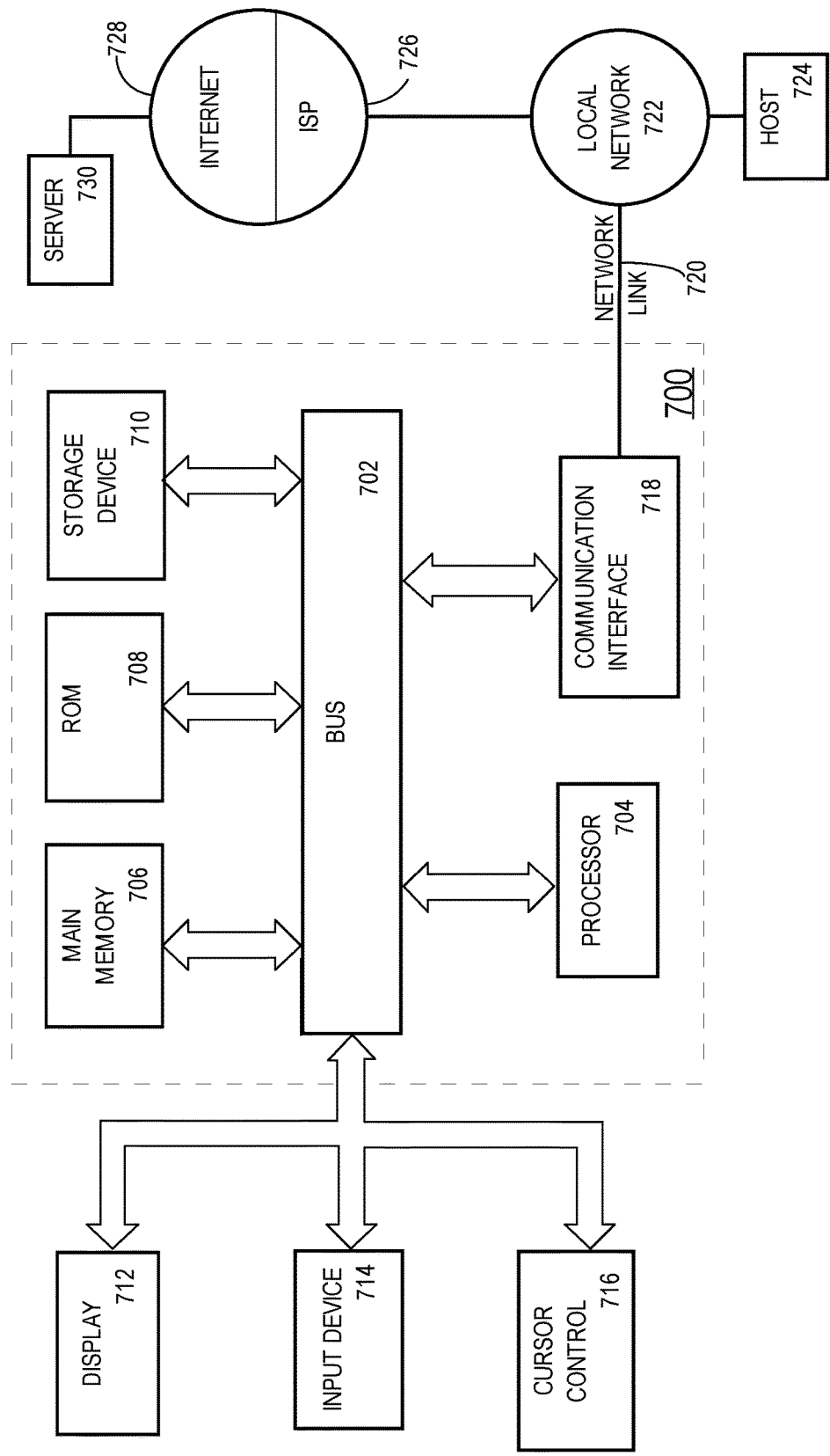
FIG. 7 is a diagram depicting a computer system that may be used in an embodiment.

FIG. 6 is a block diagram of a basic software system 600 that may be employed for controlling the operation of computing system 700 of FIG. 7. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 710 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Multi-Node Database Management System

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    during compile time:
        receiving a query expression tree;
        collecting encoding-type information from one or more nodes of the query expression tree;
        consolidating the collected encoding-type information;
        propagating the consolidated encoding-type information up the query expression tree;
        pushing the consolidated encoding-type information down the query expression tree for one or more nodes in the query expression tree that do not have any assigned encoding-type; and
        determining a set of nodes in the query expression tree that need to be processed by a respective transcode operator of a set of transcode operators, wherein each transcode operator of said set of transcode operators encodes respective one or more input columns; and
    within the query expression tree adding the respective transcode operator of each node in the set of nodes to said each node, wherein the respective transcode operator of each node of the set of nodes will be executed during runtime in association with said each node in the set of nodes;
    wherein the method is performed by one or more computing devices.

2. The method of claim 1, wherein collecting encoding-type information from the one or more nodes of the query expression tree comprises:
    in response to determining that a particular node in the query expression tree represents a constant, not assigning any encoding-type to the particular node;
    in response to determining that a particular node in the query expression tree is an input column, collecting encoding-type information for the particular node; and
    in response to determining that a particular node in the query expression tree is an expression node, recursively processing the particular node to collect encoding-type information.

3. The method of claim 1, wherein consolidating the collected encoding-type information comprises:
    for every set of collected encoding-types belonging to a set of child nodes in the query expression tree,
        determining a minimal encoding that subsumes the collected encoding-types; and
        allocating a parent node of the set of child nodes with the resulting minimal encoding.

4. The method of claim 3, wherein determining a minimal encoding that subsumes the collected encoding-types comprises:
    determining the minimal encoding in a partially ordered set of encodings of a same data-type, wherein the order is based on a subsumption relation.

5. The method of claim 1, wherein pushing the encoding-type information down the query expression tree comprises traversing the query expression tree to:
    set encoding-type of a particular node based on the encoding-type set of a parent node; and set a Boolean variable associated with the particular node based on whether the encoding-type of the particular node changed when the encoding-type of the particular node was set to that of the parent node.

6. The method of claim 5, wherein setting the Boolean Variable associated with the particular node further involves:
setting the Boolean variable to "true" when the encoding-type of the particular node changed when the encoding-type of the particular node was set to the encoding-type of the parent node; and
setting the Boolean variable to "false" when the encoding-type of the particular node did not change when the encoding-type of the particular node was set to the encoding-type of the parent node.

7. The method of claim 6, wherein determining a set of nodes in the query expression tree that need to be processed by a respective transcode operator involves:
determining particular nodes whose associated Boolean variable are set to "true"; and
allocating a transcode operator to perform appropriate encoding-type changes for the particular nodes.

8. The method of claim 1, wherein the nodes of the query expression tree comprise at least one of: input columns, constants, and operands.

9. The method of claim 5, wherein the traversing the query expression tree is performed depth first.

10. The method of claim 1, wherein executing the transcode operator during runtime in association with each node in the set of the nodes enforces appropriate encoding type change in each node in the set of nodes.

11. One or more non-transitory computer-readable storage medium storing instructions that, when executed by one or more processors, cause:
during compile time:
receiving a query expression tree;
collecting encoding-type information from one or more nodes of the query expression tree;
consolidating the collected encoding-type information;
propagating the consolidated encoding-type information up the query expression tree;
pushing the consolidated encoding-type information down the query expression tree for one or more nodes in the query expression tree that do not have any assigned encoding-type; and
determining a set of nodes in the query expression tree that need to be processed by a respective transcode operator of a set of transcode operators, wherein each transcode operator of said set of transcode operators encodes respective one or more input columns; and
within the query expression tree, adding the respective transcode operator of each node in the set of nodes to said each node, wherein the respective transcode operator of each node of the set of nodes will be executed during runtime in association with said each node in the set of node.

12. The non-transitory computer-readable storage medium of claim 11, wherein collecting encoding-type information from the one or more nodes of the query expression tree comprises:
in response to determining that a particular node in the query expression tree represents a constant, not assigning any encoding-type to the particular node;
in response to determining that a particular node in the query expression tree is an input column, collecting encoding-type information for the particular node; and
in response to determining that a particular node in the query expression tree is an expression node, recursively processing the particular node to collect encoding-type information.

13. The non-transitory computer-readable storage medium of claim 11, wherein consolidating the collected encoding-type information comprises:
for every set of collected encoding-types belonging to a set of child nodes in the query expression tree,
determining a minimal encoding that subsumes the collected encoding-types; and
allocating a parent node of the set of child nodes with the resulting minimal encoding.

14. The non-transitory computer-readable storage medium of claim 13, wherein determining a minimal encoding that subsumes the collected encoding-types comprises:
determining the minimal encoding in a partially ordered set of encodings of a same data-type, wherein the order is based on a subsumption relation.

15. The non-transitory computer-readable storage medium of claim 11, wherein pushing the encoding-type information down the query expression tree comprises traversing the query expression tree to:
set encoding-type of a particular node based on the encoding-type set of a parent node; and
set a Boolean variable associated with the particular node based on whether the encoding-type of the particular node changed when the encoding-type of the particular node was set to that of the parent node.

16. The non-transitory computer-readable storage medium of claim 15, wherein setting the Boolean Variable associated with the particular node further involves:
setting the Boolean variable to "true" when the encoding-type of the particular node changed when the encoding-type of the particular node was set to the encoding-type of the parent node; and
setting the Boolean variable to "false" when the encoding-type of the particular node did not change when the encoding-type of the particular node was set to the encoding-type of the parent node.

17. The non-transitory computer-readable storage medium of claim 16, wherein determining a set of nodes in the query expression tree that need to be processed by a respective transcode operator involves:
determining particular nodes whose associated Boolean variable are set to "true"; and
allocating a transcode operator to perform appropriate encoding-type changes for the particular nodes.

18. The non-transitory computer-readable storage medium of claim 11, wherein the nodes of the query expression tree comprise at least one of: input columns, constants, and operands.

19. The non-transitory computer-readable storage medium of claim 15, wherein the instructions include instructions that, when execuated by said one or more processors, cause the traversing the query expression tree to be performed depth first.

20. The non-transitory computer-readable storage medium of claim 11, wherein the instructions include instructions that, when executed by said one or more processors, cause executing the transcode operator during runtime in association with each node in the set of the nodes to enforce appropriate encoding type change in each node in the set of nodes.

* * * * *

UNITED STATES PATENT AND TRADEMARK OFFICE
CERTIFICATE OF CORRECTION

PATENT NO. : 10,685,021 B2
APPLICATION NO. : 15/791696
DATED : June 16, 2020
INVENTOR(S) : Fender et al.

Page 1 of 1

It is certified that error appears in the above-identified patent and that said Letters Patent is hereby corrected as shown below:

In the Drawings

On sheet 4 of 7, in FIG. 4, under Reference Numeral 436, Line 2, delete "evalutes" and insert -- evaluates --, therefor.

In the Specification

In Column 10, Line 43, delete "$column_x$" and insert -- $column_y$ --, therefor.

In the Claims

In Column 18, Line 28, in Claim 1, delete "tree" and insert -- tree, --, therefor.

In Column 19, Line 55, in Claim 11, delete "node." and insert -- nodes. --, therefor.

In Column 20, Line 55, in Claim 19, delete "execuated" and insert -- executed --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*